United States Patent
Wang et al.

(10) Patent No.: US 12,284,007 B2
(45) Date of Patent: Apr. 22, 2025

(54) PAPR REDUCTION OF MIMO-OFDM

(71) Applicant: NOKIA SOLUTIONS AND NETWORKS OY, Espoo (FI)

(72) Inventors: Lijun Wang, Zhejiang (CN); Weiqiang Mao, Zhejiang (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 550 days.

(21) Appl. No.: 17/285,597

(22) PCT Filed: Nov. 5, 2018

(86) PCT No.: PCT/CN2018/113987
§ 371 (c)(1),
(2) Date: Apr. 15, 2021

(87) PCT Pub. No.: WO2020/093203
PCT Pub. Date: May 14, 2020

(65) Prior Publication Data
US 2021/0399935 A1     Dec. 23, 2021

(51) Int. Cl.
*H04B 7/0413* (2017.01)
*H04L 27/26* (2006.01)
*H04W 72/0453* (2023.01)

(52) U.S. Cl.
CPC ....... *H04B 7/0413* (2013.01); *H04L 27/2623* (2013.01); *H04W 72/0453* (2013.01); *H04L 27/2626* (2013.01)

(58) Field of Classification Search
CPC .......... H04L 27/2623; H04L 27/2626; H04W 72/0453
See application file for complete search history.

(56) References Cited

U.S. PATENT DOCUMENTS 8,744,009 B2      6/2014  Kleider et al.
2006/0078066 A1*  4/2006  Yun ..................... H04B 7/0848
                                                    375/299

(Continued)

FOREIGN PATENT DOCUMENTS

CN    101919171 A    12/2010
CN    104917714 A     9/2015

(Continued)

OTHER PUBLICATIONS

International Search Report and Written Opinion dated Aug. 5, 2019 corresponding to International Patent Application No. PCT/CN2018/113987.

(Continued)

*Primary Examiner* — Jackie Zuniga Abad
(74) *Attorney, Agent, or Firm* — SQUIRE PATTON BOGGS (US) LLP

(57) ABSTRACT

Embodiments of the present disclosure relate to methods, devices and computer readable mediums for a unified non-linear precoding procedure. The method comprises generating sequences of OFDM symbols on subcarriers on a downlink channel from the network device to a terminal device; determining a processing matrix of the downlink channel at least partially based on characteristics of the downlink channel; obtaining reference values of parameters of a signal generation model; and iteratively performing the following for a number of times: adjusting, based on the sequences of OFDM symbols and the processing matrix, the reference values of the parameters of the signal generation model, the parameters being signals for transmitting via transmitting ports of the network device on the downlink channel to the terminal device; and updating the reference values of the parameters of the signal generation model by (Continued)

clipping the adjusted values of the parameters of the signal generation model.

17 Claims, 11 Drawing Sheets

(56) References Cited

U.S. PATENT DOCUMENTS

| | | | | |
|---|---|---|---|---|
| 2018/0287675 | A1* | 10/2018 | Sheikh | H04B 7/0456 |
| 2019/0354894 | A1* | 11/2019 | Lazovich | G06E 1/00 |
| 2019/0356394 | A1* | 11/2019 | Bunandar | H04J 14/02 |
| 2020/0052945 | A1* | 2/2020 | Kant | H04L 27/2623 |
| 2021/0099207 | A1* | 4/2021 | Mao | H04L 25/03891 |

FOREIGN PATENT DOCUMENTS

| | | |
|---|---|---|
| CN | 105743834 A | 7/2016 |
| EP | 1933517 A1 | 6/2008 |
| WO | WO 2016/134529 A1 | 9/2016 |
| WO | 2018/147775 A1 | 8/2018 |

OTHER PUBLICATIONS

Office Action dated Oct. 25, 2022, corresponding to Chinese Patent Application No. 201880099244.6.
Search Report dated Oct. 12, 2022, corresponding to Chinese Patent Application No. 201880099244.6.
Extended European Search Report corresponding to EP Application No. 18939320.0, dated May 31, 2022.
Sohn et al., "PAPR Reduction of OFDM Signals using Radial Basis Function Neural", Communication Technology, 2006, ICCT '06, International Conference on, IEEE, PI, Nov. 1, 2006, pp. 1-5, KP031071662.
Amit et al., "PAPR Reduction of OFDM Signals: An Adaptive-Network-Based Fuzzy Inference Approach", Wireless Personal Communications, Springer, Dordrecht, NL, vol. 92, No. 2, Aug. 4, 2016, pp. 587-601, XP036130284.
European Office Action issued in corresponding European Patent Application No. 18 939 320.0-1206 on Nov. 19, 2024.

* cited by examiner

PAPR REDUCTION OF MIMO-OFDM

TECHNICAL FIELD

Embodiments of the present disclosure generally relate to the field of telecommunication, and in particular, to methods, devices and computer readable storage media for Peak to Average Power Ratio (PAPR) reduction of Multiple-Input Multiple-Output-Orthogonal Frequency Division Multiplexing (MIMO-OFDM).

BACKGROUND

Multiple-Input Multiple-Output-Orthogonal Frequency Division Multiplexing (MIMO-OFDM) is the dominant air interface for 4G and 5G broadband wireless communications. It combines Multiple-input Multiple-output (MIMO) technology, which multiplies capacity by transmitting different signals over multiple antennas, and Orthogonal Frequency Division Multiplexing (OFDM), which divides a radio channel into a large number of closely spaced sub-channels to provide more reliable communications at high speeds.

A massive MIMO-OFDM downlink system can be depicted as a system with a set of transmitting antennas serving several streams simultaneously using OFDM technique. The symbols on the subcarriers may be processed before transmission based on the channel characters, to obtain the signal to be transmitted. Generally, as one of the major disadvantages of OFDM, the time domain signals on the transmitting antennas have large envelope fluctuations. When the signals pass through high power amplifiers (HPAs), the large envelope fluctuations would cause severe nonlinear distortions.

SUMMARY

In general, example embodiments of the present disclosure provide methods, devices and computer readable storage media for PAPR reduction of MIMO-OFDM.

In a first aspect, there is provided method implemented at a network device. The method comprises generating sequences of OFDM symbols on subcarriers on a downlink channel from the network device to a terminal device; determining a processing matrix of the downlink channel at least partially based on characteristics of the downlink channel; obtaining reference values of parameters of a signal generation model; and iteratively performing the following for a number of times: adjusting, based on the sequences of OFDM symbols and the processing matrix, the reference values of the parameters of the signal generation model, the parameters being signals for transmitting via transmitting ports of the network device on the downlink channel to the terminal device; and updating the reference values of the parameters of the signal generation model by clipping the adjusted values of the parameters of the signal generation model.

In a second aspect, there is provided a network device. The device comprises at least one processor; and at least one memory including computer program codes. The at least one memory and the computer program codes are configured to, with the at least one processor, cause the device at least to perform the method according to the first aspect.

In a third aspect, there is provided an apparatus comprising means to perform the steps of the method according to the first aspect.

In a fourth aspect, there is provided a computer readable medium having a computer program stored thereon which, when executed by at least one processor of a device, causes the device to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
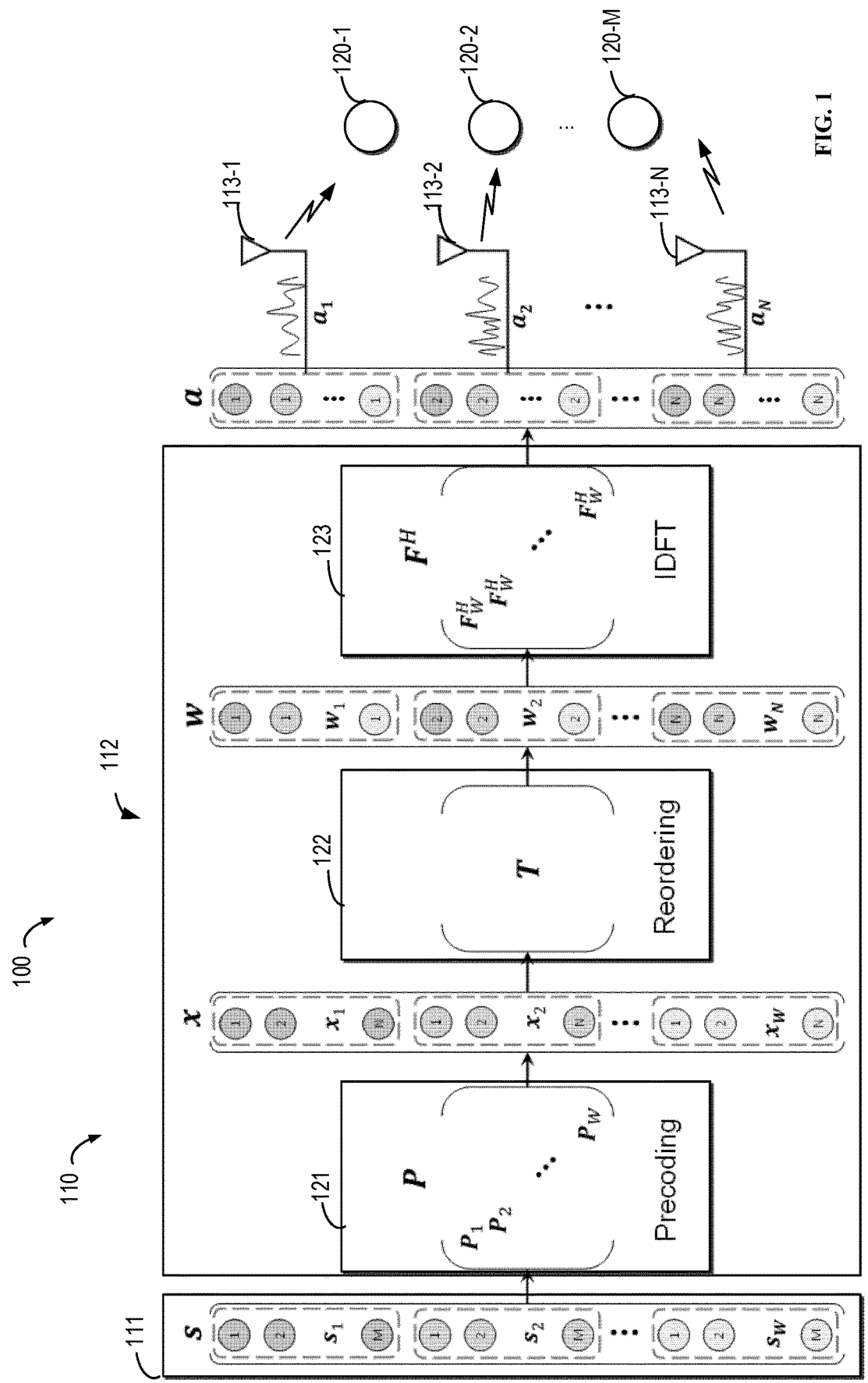
FIG. 1 shows an example communication system 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 illustrates a communication network 100 in which embodiments of the present disclosure can be implemented. Communication network 100 comprises network device (e.g., gNB) 110 and terminal devices (e.g., UEs) 120-1, . . . , 120-M (hereinafter collectively referred to as terminal devices 120 or UEs 120) in communication therewith. The gNB 110 may comprise antennas 113-1, . . . , 113-N and the number of the antennas N of the gNB 110 may be more than the number of the terminal devices M. The gNB 100 and the UEs 120-1, . . . , 120-M may communicate with each other via a channel between the gNB 100 and the UEs 120-1, . . . , 120-M.

For the purpose of discussion, in the following, some embodiments will be described with reference to UEs as examples of the terminal devices. The terminal devices may also be considered as WIFI or other relay devices.

It is to be understood that the numbers of network devices and terminal devices are shown only for the purpose of illustration without suggesting any limitation. The communication network 100 may include any suitable numbers of network devices and terminal devices. The communication between the network device 110 and the terminal device 120 may utilize any suitable technology that already exists or will be developed in the future.

As shown in FIG. 1, the gNB 110 may comprise a symbol generation module 111 for generating sequences of Orthogonal Frequency Division Multiplexing (OFDM) symbols and a processing module 112 for preprocessing the generated sequences of symbols, to obtain the signals to be transmitted. The gNB 110 may further comprise antennas 113-1, ..., 113-N for transmitting the signals. The number of the antennas N of the gNB 110 may be more than the number of the terminal devices M. The gNB 110 may transmit signals via the antennas 113-1, ..., 113-N to the UEs 120-1, ..., 120-M.

The processing module 112 may comprise some sub-module, such as a precoding module 121, a reordering module 122 and an Inverse Discrete Fourier Transform (IDFT), as shown in FIG. 1. Different module may perform different preprocessing procedure for the sequences of symbols.

As an example, the communication system 100 may refer to a massive MIMO-OFDM downlink system, which can be depicted as a gNB with N transmit antennas serving M active streams simultaneously using OFDM technique with W subcarriers. As an example, M streams may correspond to M single-antenna UEs. As another example, M streams may correspond to a number of UEs, wherein each UE can have one or more streams, but the total number of streams is M.

Denote the symbols transmitted on kth subcarrier as a column vector $s_k$, which has size M×1, the precoding matrix on kth subcarrier as $P_k$ (with size N×M) and the precoded symbols on kth subcarrier as a vector $x_k$, which has size N×1. Then $x_k$ may be represented by Equation (1) as below:

$$x_k = P_k s_k, 1 \leq k \leq W \quad (1)$$

Denote X as a matrix whose columns are $x_k$, and denote ith column of $X^T$ ($(\cdot)^T$ means transpose) as $w_i$ (with size W×1), which means the frequency domain signal on different subcarriers on ith antenna, where i (1≤i≤N) is the index of antennas.

Since DFT can be treated as matrix multiplication, denote the W×W DFT matrix as $F_W$, then the corresponding IDFT matrix can be denoted as $F_W^H$ ($(\cdot)^H$ means conjugate and transpose), and $F_W F_W^H = I_W$ ($I_W$ denotes the W×W identity matrix). Denote the time domain signal on the ith antenna as $a_i$, and $a_i$ can be calculated by Equation (2) as below:

$$a_i = F_W^H w_i, 1 \leq i \leq N \quad (2)$$

Generally, as one of the major disadvantages of OFDM, $a_i$ would have large envelope fluctuations. When $a_i$ passes through high power amplifiers (HPAs), this large envelope fluctuations would cause severe nonlinear distortions.

Peak-to-average power ratio (PAPR, also called PAR) is a well-known measure of the envelope fluctuations. For basic OFDM systems, a high PAPR is an inherent drawback, which is also faced by massive MIMO-OFDM systems. Since the massive MIMO has redundant degrees-of-freedom, which can be exploited to reduce PAPR significantly.

If the MIMO-OFDM downlink system is further modelled as matrix multiplications, as shown in FIG. 1. Concatenate symbols on all subcarriers as one vector and denote as s (with size MW×1). A block diagonal matrix P (with size NW×MW) may be constructed with precoding matrices of all subcarriers lying on the diagonal. The precoded symbols on all subcarriers may be concatenated as one vector x (with size NW×1), then x may be represented by Equation (3) as below:

$$x = Ps \quad (3)$$

Similarly, a block diagonal matrix H (with size MW×NW) may be contrast as with channel matrices of all subcarriers lying on the diagonal, and s can be recovered by Equation (4) as below:

$$s = Hx \quad (4)$$

To calculate signals in time domain, x should be reordered as w (with size NW×1). Similarly, the reordering operation can be denoted as a reorder matrix T (Here, T is a real NW×NW sparse matrix and $TT^T = I$). Then w can be expressed by Equation (5):

$$w = Tx \quad (4)$$

and x can be recovered by Equation (6):

$$x = T^T w \quad (5)$$

Denote F as $F \triangleq I_N \oplus F_W$, where $\oplus$ denotes the Kronecker product. Then the concatenation of all signals, which is denoted as a (with size NW×1), can be obtained by Equation (7) as below:

$$a = F^H w \quad (7)$$

and w can be recovered from a in Equation (8) as below:

$$w = Fa \quad (8)$$

Combining the Equations (3), (5) and (7), a can be rewritten as the linear transformation of s by Equation (9) as below:

$$a = F^H T P s \quad (9)$$

In the Equation (9), $F^H$ and T are fixed when the basic parameters (N and W) of massive MIMO-OFDM are known. Therefore, the precoding matrix decides whether the signal vector a has large or low PAPR. Thus, the problem of large PAPR may be converted as finding a suitable precoding matrix which makes the signal vector a have low PAPR.

Combining the Equations (4), (6) and (8), Equation (10) can be inferred as below:

$$s = HT^T Fa \quad (10)$$

Since H, $F^H$ and T are all fixed when N and W are known, the problem can be further converted as finding such a signal vector a, which has low PAPR. Denote E as $E \triangleq HT^T F$, then the Equation (10) can be rewritten by Equation (11) as below:

$$s = Ea \quad (6)$$

When the gNB 110 transmits specific symbols to users (such as UE 120-1 ..., 120-M), both s and E are known, only a stays unknown. Thus, in order to find a suitable precoded signals on antennas, the Equation (11) can be considered to solve with PAPR constraints.

Thus, in a massive MIMO-OFDM system, if the gNB 110 transmits symbols to UE 120-1 ..., 120-M through antennas using OFDM technique and the channel matrix are known, it is important to determine the signals on antennas with the lowest PAPR and without loss of information contained by the symbols.

Some approaches are proposed to attempt to determine the signals on antennas, i.e. a in Equation (11). For example, the clipping approach may be used to limiting the amplitude of the signals. As an option, the clipping procedure may be performed for each antenna separately. As another option, the clipping procedure may be performed for the concatenation of signals on all antennas.

In a case of clipping the concatenation of signals on all antennas, oversampling is often adopted. For the oversampled signals, clipping would generate out-of-band leakage, which needs a follow-up filtering operation in frequency domain. However, conventional MIMO-OFDM systems disallow such an oversampling operation.

Furthermore, zero-forcing precoding followed by clipping is an efficient method for PAPR reduction. The complexity of zero-forcing plus clipping algorithm mainly comes from the zero-forcing precoding, and the total complexity is $O(WM^3+WNM^2)$. As the number of streams increasing, the complexity would increase cubically, which it is difficult to achieve in practice.

Meanwhile, since clipping operation would lead to some losses of the original information, it needs to be balanced between PAPR reductions and information losses in practical systems.

A further approach proposes a scheme for optimizing the signal vector by converting the Equation (11). An algorithm named fast iterative truncation algorithm (FITRA) is introduced to solve this problem. However, this algorithm also requests a huge number of the iteration time, which may be hardly used in practical system due to its hyperslow convergence.

Another approach proposes an efficient Bayesian PAPR reduction method, named EM-TGM-GAMP method, which needs less iteration to converge. This approach intends to embed generalized approximate message passing (GAMP) into a variational expectation-maximization (EM) framework to find the optimal solution. It has got a better PAPR reduction than FITRA.

In order to further reduce the PAPR of the signals on the antennas and meanwhile guarantee the balance between PAPR reductions and information losses in practical systems. The embodiments of the present disclosure propose iterative PAPR reduction scheme based on Artificial Neural Network (ANN) technology.

Principle and implementations of the present disclosure will be described in detail below with reference to FIG. 2, which shows a flowchart of an example method 200 for PAPR reduction according to some example embodiments of the present disclosure. The method 200 can be implemented at the gNB 110 as shown in FIG. 1. For the purpose of discussion, the method 400 will be described with reference to FIG. 1.

Figure 2:
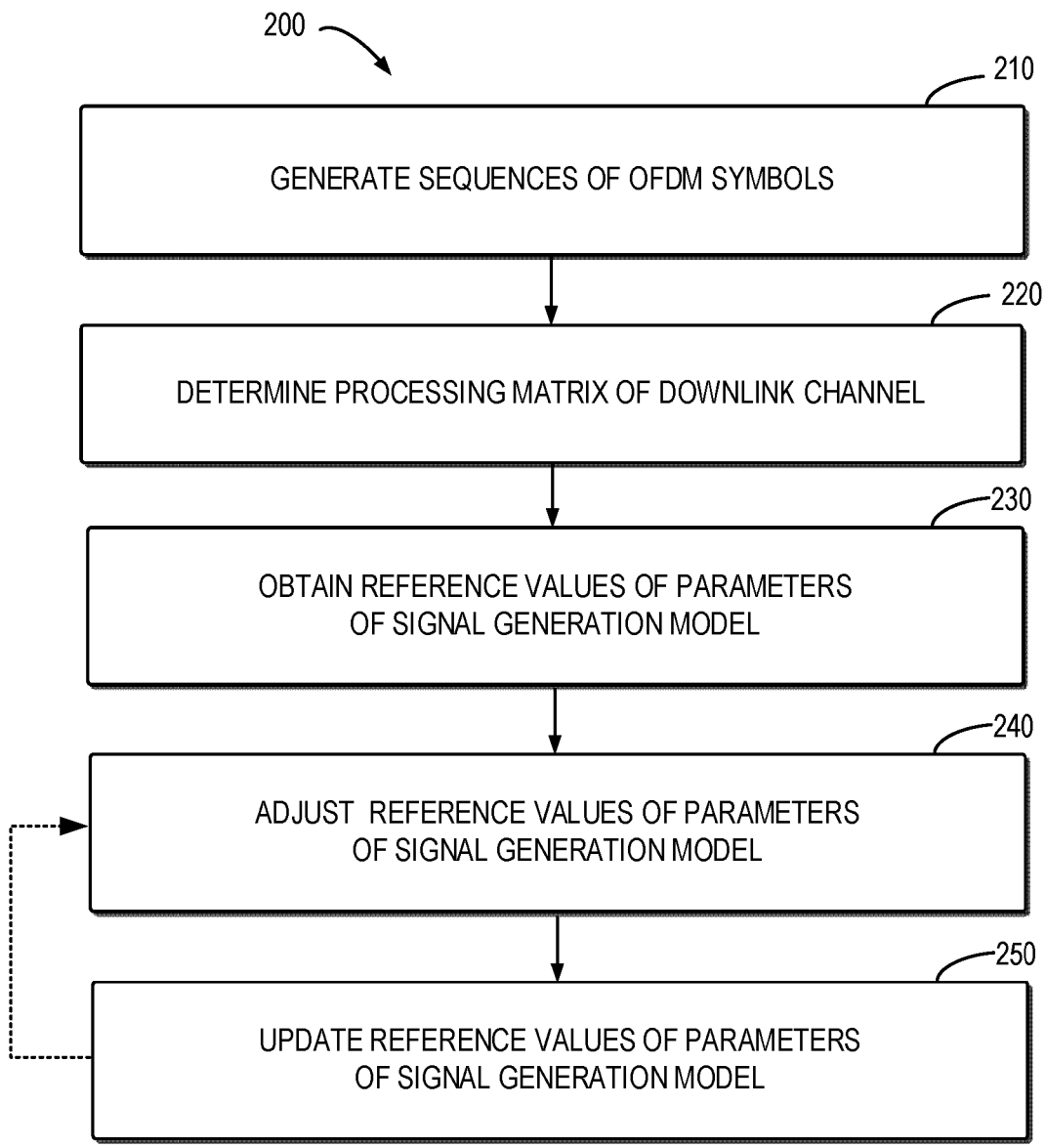
FIG. 2 shows a flowchart of an example method 200 for PAPR reduction of MIMO-OFDM according to some example embodiments of the present disclosure.

As shown in FIG. 2, at 210, the gNB 110 generates sequences of OFDM symbols on subcarriers on a downlink channel from the gNB 110 to a UE 120. The sequences of OFDM symbols may be considered to be generated by the data stream to be transmitted.

In some embodiments, the gNB 110 may obtain the number of the subcarriers on the downlink channel, the number of OFDM symbols in each of the sequences, and the number of the antennas of the gNB 110 and generate the sequences of OFDM symbols based on the number of the subcarriers, the number of OFDM symbols in each of the sequences and the number of the antennas.

In some embodiments, the number of OFDM symbols in each of the sequences may be considered as the number of the data stream on the gNB 110.

As shown in FIG. 2, at 220, the gNB 110 determines a processing matrix of the downlink channel at least partially based on characteristics of the downlink channel.

In some embodiments, the gNB 110 may determine a channel matrix characterizing the downlink channel based on the number of the subcarriers on the downlink channel, the number of OFDM symbols in each of the sequences and the number of the antennas of the gNB 110 and determine the processing matrix by performing transposing and IDFT on the channel matrix.

As described above, by means of the Equation (11), the problem of massive MIMO-OFDM PAPR reduction may be converted to find the signal vector a of linear equations under PAPR constraints. When the gNB 110 transmitting specific symbols to users (such as UE 120-1 ..., 120-M), both s and E are known.

In order to control the out-of-band leakage, the Equation (4) can be split as the Equation (12):

$$\begin{cases} s_k = H_k x_k, & k \in \mathcal{T} \\ 0_{M\times 1} = H_k x_k, & k \in \mathcal{T}^c \end{cases} \quad (12)$$

Where $I_N$ is the N×N identity matrix. All $s_k$, $k \in \mathcal{T}$ and $0_{N\times 1}$, $k \in \mathcal{T}^c$ can be concatenates as $\bar{s}$ (with size $(M|\mathcal{T}|+N|\mathcal{T}^c|) \times 1)$, and a block diagonal matrix $\bar{H}$ may be constructed with its diagonal blocks equal to $H_k$ for $k \in \mathcal{T}$ and $I_N$ for $k \in \mathcal{T}^c$.

The dimensionality of $\bar{H}$ is $(M|\mathcal{T}|+N|\mathcal{T}^c|) \times NW$. Combining the Equations (4), (6) and (8), an Equation (13), which is similar with the Equation (10), may be inferred as below:

$$\bar{s} = \bar{H}x = \bar{H}T^T Fa \quad (13)$$

Denote $\bar{E}$ as $\bar{E} \triangleq \bar{H}T^T F$, the Equation (13) may be rewritten by Equation (14) as below:

$$\bar{s} = \bar{E}a \quad (14)$$

That is, the reformed sequence of the OFDM symbols $\bar{s}$ and the reformed channel matrix $\bar{H}$ are obtained. Let $K \triangleq M|\mathcal{T}|+N|\mathcal{T}^c|$ for notational convenience. Then $\bar{s}$ is a K×1 vector, $\bar{E}$ is a K×NW matrix, and a is a NW×1 vector.

If the sequence of the OFDM symbols $\bar{s}$ and the channel matrix $\bar{H}$ are determined, the gNB 110 may further determine the signal vector a.

Figure 3:
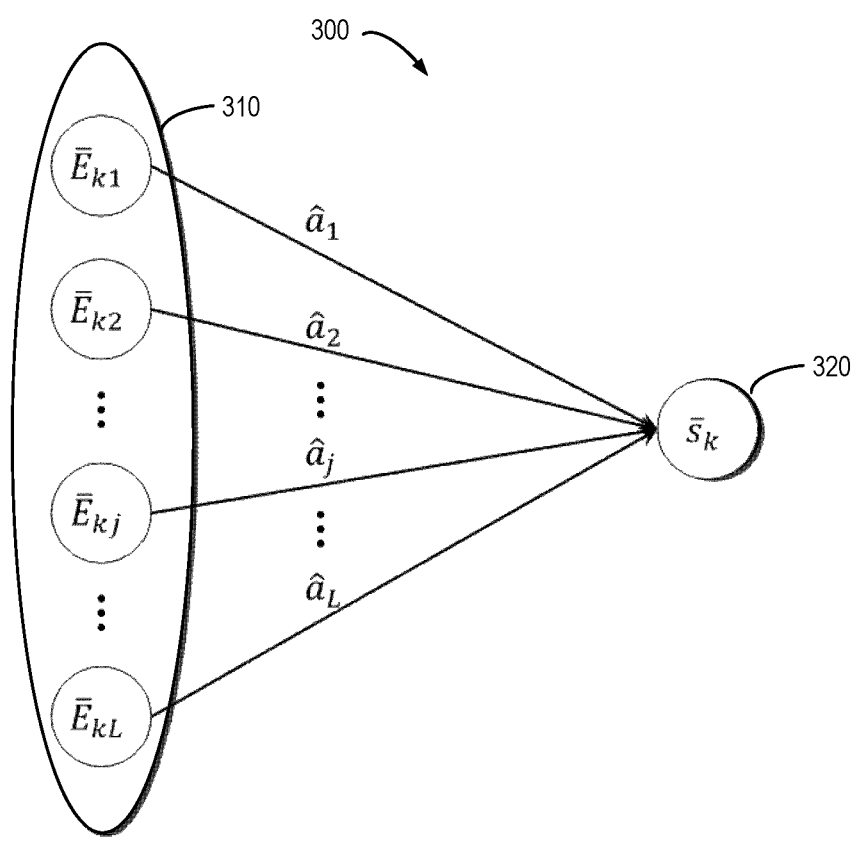
FIG. 3 shows an example for PAPR reduction of MIMO-OFDM according to some example embodiments of the present disclosure.

A two-layer linear ANN may be introduced to determine the signal vector a. Based on the the sequence of the OFDM symbols $\bar{s}$ and the channel matrix $\bar{H}$, a signal generation model could be constructed. FIG. 3 shows an example of the signal generation model 300 of the present disclosure.

As shown in FIG. 3, the signal generation model 300 may comprise an input layer 310 and an output layer 320. Denote â (with size NW×1) as the estimation of a, rows of $\bar{E}$ may be used as input and elements of $\bar{s}$ may be used as output. Denote $\bar{s}_k$ as the kth element of â and denote $\bar{E}_k$ as the kth row of $\bar{E}$, for each pair of $(\bar{s}_k, \bar{E}_k)$, the weight vector a would be updated. The may be understood as the parameters of a signal generation model 300, which are signals for transmitting via transmitting ports of the gNB 110 on the downlink channel to the UE 120.

As shown in FIG. 2, at 230, the gNB 110 obtains reference values of the parameters of a signal generation model 300. For example, in the initial phase, a reference value a of the parameters of a signal generation model 300 may be set to a preset value.

At 240, the gNB 110 adjusts the parameters of a signal generation model 300 based on $\bar{s}_k$, $\bar{E}_k$ and a reference value â.

In some embodiments, the reference values are adjusted using an optimization process. The gNB 110 may determine differences between the sequences of the OFDM symbols and a product of the parameters of the signal generation model 300 and the processing matrix of the downlink channel. The gNB 110 may adjust the reference values of the parameters of the signal generation model based on the differences.

In some embodiments, the optimization process may be selected from a group consisting of Stochastic Gradient Descent (SGD), Batch Gradient Descent (BGD) and Mini-batch Gradient Descent (Mini-batch GD).

In some embodiments, an SGD based precoding algorithm may represent as follow.

The different, i.e. the error value may be calculated by Equation (15):

$$\delta = \bar{s}_k - \bar{E}_k \hat{a} \quad (15)$$

A gradient vector may be calculated Equation (16):

$$g = \frac{\delta}{\|\bar{E}_k\|_2^2} \bar{E} H_k \quad (16)$$

The reference values a of the parameters of the signal generation mode 300 may be adjusted by Equation (17):

$$\bar{a} = \bar{a} + \eta g \quad (17)$$

where $\eta$ may refer to as the learning rate for SGD empirically, for example, $\eta = 1.0$.

At 250, the gNB 110 updates the reference values $\hat{a}$ of the parameters of the signal generation model 300 by clipping the adjusted values of the parameters of the signal generation model.

In some embodiments, a maximum iteration times n may be set to perform the actions at 240 and 250 iteratively. That is to say, the adjusted values of the parameters of the signal generation model 300 may be used as a reference value $\hat{a}$ at 240.

For the clipping procedure, in some embodiments, the clipping ratio may be set to a preset value in the initial phase. The clipping ratio may be considered as an important parameter to limit the amplitude of the signals.

If the adaptive clipping ratio is used, the increment of clipping ratio may be calculated for each iteration by Equations (18) and (19):

$$\Delta \mu = \frac{\mu_n - \mu_0}{n} \quad (18)$$

$$\mu = \mu + \Delta \mu \quad (19)$$

where $\mu_0$ may refer to as an initial clipping ratio. For example, $\mu = \mu_0 = 0.8$, $\mu_n = 1.2$.

If the fixed clipping ratio is used, for example, the clipping ratio may be set to $\mu = 1.03$.

Base on the adjusted values of the parameters, the number of the antennas and the number of the subcarrier, the average power of $\hat{a}$ may be calculated by Equation (20):

$$P_0 = \frac{\|\hat{a}\|^2}{NW} \quad (20)$$

A maximum clipping times $n^{clip}$ may be set for the clipping procedure. For example, the maximum clipping times may be set to $n^{clip} < n$ empirically. For example, $n^{clip} = n - 1$.

Given $\xi = \mu \sqrt{P_0}$ and the Equation (20), the clipped $\hat{a}$ may be calculated by Equation (21):

$$\hat{a}_j^{clip} = \begin{cases} \hat{a}_j, & \|\hat{a}_j\| \leq \zeta \\ \frac{\zeta}{\|\hat{a}_j\|} \hat{a}_j, & \|\hat{a}_j\| > \zeta \end{cases} \quad (21)$$

where $\xi$ may refer to as the clipping threshold, i.e. an upper limit of the amplitudes of the signals. $\hat{a}^{clip}$ may refer to as a temporary vector for the clipped $\hat{a}$.

The clipping residual may be calculated by Equation (22):

$$\check{g} = \hat{a}^{clip} - \hat{a} \quad (22)$$

The clipping "momentum" $\check{m}$ (with size NW×1), which indicates the clipping tendency accumulated through previous clipping operations, may be updated by Equation (23), which may be set to a present value in the initial phase:

$$\check{m} = \alpha \check{m} + \beta \check{g} \quad (23)$$

where accumulated rates $\alpha$ and $\beta$ may be set empirically, for example, $\alpha = 0.2$, $\beta = 2.0$. Further, a small threshold $\varepsilon \geq 0$ may be set for clipping "momentum" $\check{m}$, for example, $\varepsilon = 10^{-8}$.

The estimated signal vector, i.e. the adjusted values of the parameters may be updated by Equation (24):

$$\hat{a} = \hat{a} + \check{m} \quad (24)$$

As described above, the adjusted values of the parameters of the signal generation model 300, which may be determined at 250, may be used as a reference value $\hat{a}$ at 240.

In the embodiments of the present disclosure, a SGD based precoding is proposed to reduce the PAPR, which has lower complexity than zero-forcing precoding. In addition, GD based precoding has benefit on the computation efficiency due to the ANN's rapid development.

Further, the precoding operation would be performed for each iteration, which would pull the clipped signal back into the solution space. It would thoroughly avoid the loss of original information. The look-ahead clipping is proposed and used to reduce the PAPR effectively. By using clipping "momentum", the PAPR of the signal can be reduced more effectively. The adaptive clipping ratio technique is proposed and used in look-ahead clipping to improve the overall performance.

Regarding to the complexity analysis of different algorithm for PAPR reduction, SGD based precoding is the dominating part of the whole algorithm, which has a computational complexity of O(KNW) per iteration, where $K \triangleq M|\mathcal{T}| + N|\mathcal{T}^c|$. Therefore, the complexity of the proposed GD based approach is O(KNW) for each iteration.

On the contrary, both FITRA and EM-TGM-GAMP have a computational complexity of $O((M|\mathcal{T}|+N|\mathcal{T}^c|)NW)$ for each iteration. Therefore, the GD based approach has the same complexity with these two approaches for each iteration. Since the GD based approach only need 10 to 20 iterations, it has a great advantage in convergence.

When $|\mathcal{T}^c| \ll |\mathcal{T}|$, $K \approx MW$, and the complexity of GD based approach would be $O(MNW^2)$. However, the complexity of zero-forcing plus clipping algorithm is $O(WM^3 + WNM^2)$. Along with the rapid growth of the amounts of concurrent users, the number of streams M increases linearly, then the cubically increasing complexity of zero-forcing plus clipping algorithm becomes a great challenge. In this situation, the GD based approach would be more attractive due to its linear increasing complexity.

In addition, the GD based approach could benefit a lot from the development of ANN, such as the appearance of neural processing unit (NPU), which is a microprocessor that specializes in the acceleration of machine learning algorithms. Therefore, the GD based approach would be much more attractive for the practical real-time systems in future.

Some performance parameters may be considered to measure the different algorithm for PAPR reduction.

For example, the PAPR (also called PAR) of a signal is defined as the ratio of the peak power of the signal to its average power, which may be represented by Equation (25):

$$PAPR(\hat{a}) = \frac{max_{0 \leq j \leq WN-1} |\hat{a}_j|^2}{\mathbb{E}\{|\hat{a}_j|^2\}} = \frac{NW\|\hat{a}\|_\infty^2}{\|\hat{a}\|_2^2} \quad (25)$$

where NW is the total length of $\hat{a}$, Equation (25) may be rewritten by Equation (26):

$$PAPR_{dB} = 10\log_{10} \frac{NW\|\hat{a}\|_\infty^2}{\|\hat{a}\|_2^2} \quad (26)$$

For example, the cubic metric (CM) may be represented by Equation (27):

$$CM = \frac{RCM - RCM_{ref}}{D} \quad (27)$$

where $RCM_{ref}$ is the reference RCM and D is a constant. where $$RCM = \sqrt{\frac{\|\hat{a}\|_6^6}{(\|\hat{a}\|_2^2)^3}}.$$

Generally, RCM and CM are considered as equivalent for simplicity. Thus, Equation (27) may be rewritten by Equation (28):

$$RCM_{dB} = 20\log_{10} \sqrt{\frac{\|\hat{a}\|_6^6}{(\|\hat{a}\|_2^2)^3}} \quad (28)$$

In some embodiments, the multiuser interference (MUI) may be represented by Equation (29):

$$MUI = \frac{\sum_{k \in \mathcal{T}} \|s_k - H_k \hat{x}_k\|_2^2}{\sum_{k \in \mathcal{T}} \|s_k\|_2^2} \quad (29)$$

where $\mathcal{T}$ is the tones set in which the tones are used for data transmission. k ($1 \leq k \leq W$) is the tone ID. $s_k$, $\hat{x}_k$ are the component of s and $\hat{x}$ on the kth subcarrier. The Equation (29) may be rewritten by Equation (30):

$$MUI_{dB} = 10\log_{10} \frac{\sum_{k \in \mathcal{T}} \|s_k - H_k \hat{x}_k\|_2^2}{\sum_{k \in \mathcal{T}} \|s_k\|_2^2} \quad (30)$$

In some embodiments, Power increase (PI) may be represented by Equation (31):

$$PI = \frac{\|\hat{x}\|_2^2}{\|x_{zf}\|_2^2} \quad (31)$$

Where $x_{zf}$ is the solution obtained by zero-forcing precoding scheme. The Equation (31) may be rewritten by Equation (32):

$$PI_{dB} = 10\log_{10} \frac{\|\hat{x}\|_2^2}{\|x_{zf}\|_2^2} \quad (32)$$

In some embodiments, Out-of-band power ratio (OBR) is introduced to measure the out-of-band radiation of the solution, which may be represented by Equation (33):

$$OBR = \frac{\sum_{k \in \mathcal{T}^C} \|\hat{x}_k\|_2^2 / |\mathcal{T}^C|}{\sum_{k \in \mathcal{T}} \|\hat{x}_k\|_2^2 / |\mathcal{T}|} = \frac{|\mathcal{T}| \sum_{k \in \mathcal{T}^C} \|\hat{x}_k\|_2^2}{|\mathcal{T}^C| \sum_{k \in \mathcal{T}} \|\hat{x}_k\|_2^2} \quad (33)$$

where $\mathcal{T}^C$ is the tones set in which the tones are used for guard bands, and $\hat{x}_k$ are the component of $\hat{x}$ on the kth subcarrier. The Equation (33) may be rewritten by Equation (34):

$$OBR_{dB} = 10\log_{10} \frac{|\mathcal{T}| \sum_{k \in \mathcal{T}^C} \|\hat{x}_k\|_2^2}{|\mathcal{T}^C| \sum_{k \in \mathcal{T}} \|\hat{x}_k\|_2^2} \quad (34)$$

For the proposed GD based PAPR reduction algorithm, some hyperparameters are quite important and has large impacts on the performances. The main hyperparameters are clipping ratio µ, and accumulating rates α, β.

Figure 4:
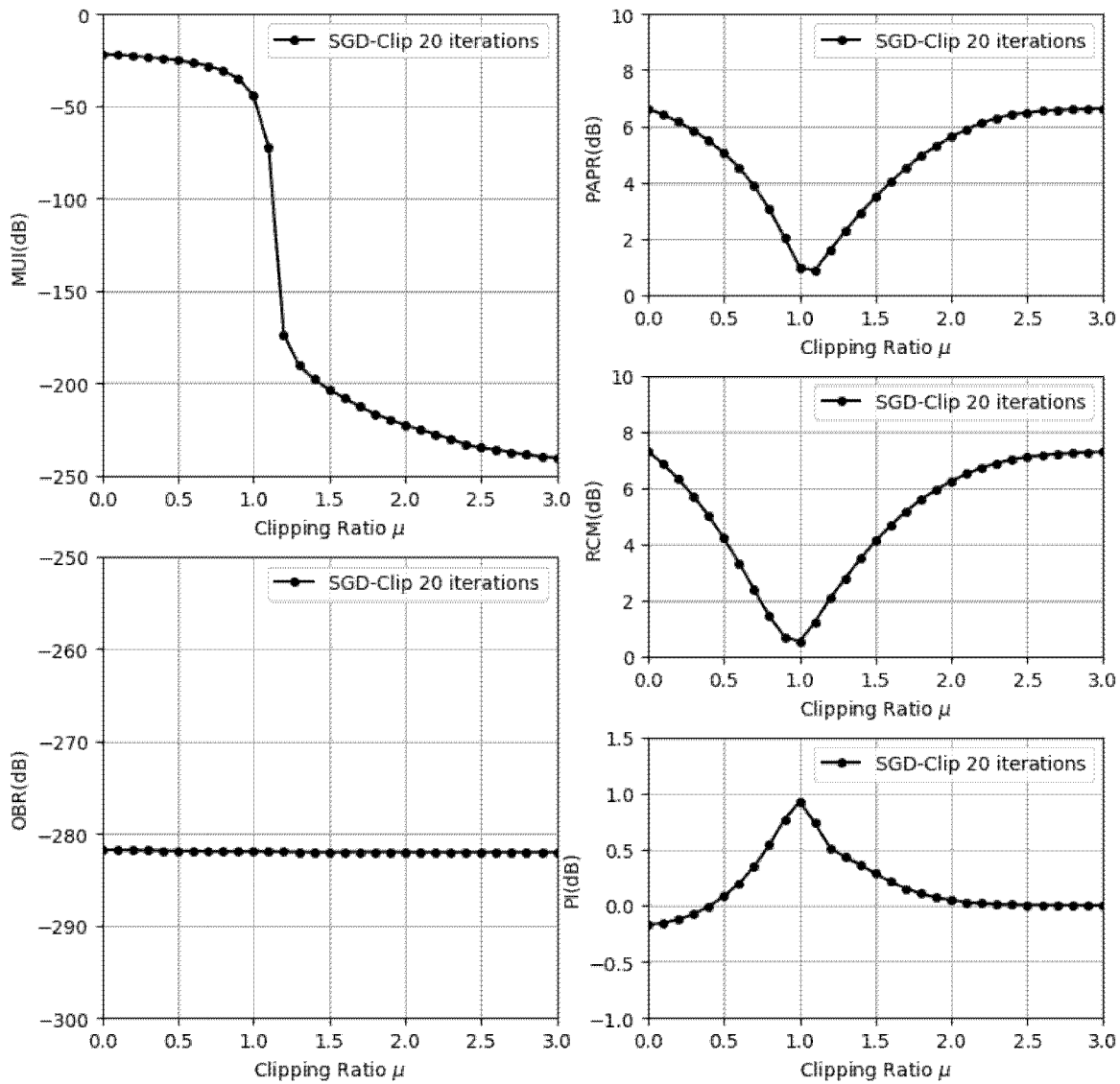
FIG. 4 shows an example for PAPR reduction of MIMO-OFDM according to some example embodiments of the present disclosure.

Clipping ratio µ is critically important for the proposed GD based PAPR reduction scheme, different values can be selected to fit different requirements. As shown in FIG. 4, clipping ratio µ has large impacts on PAPR, RCM, PI, MUI and OBR performances, respectively. PAPR gets the lowest value when clipping ratio is between 1.0 and 1.1, while RCM get its lowest value when µ is between 0.9 and 1.0.

For fixed clipping ratio, if PAPR and RCM, which are two critical measurements for signal fluctuations, are considered, clipping ratio should be selected around 1.0. An empirical clipping ratio for the best PAPR and RCM reduction is about 1.03. If MUI and PI are taken in consideration as well, µ=1.2 might be another desirable choice for relatively lower MUI and PI.

For adaptive clipping ratio, since the best clipping ratio is around 1.0, the clipping ratio can be increased from lower than 1.0 to larger than 1.0 during iterations automatically, which can not only get lower PAPR and RCM, but also relatively lower MUI and PI. Empirically, adaptive clipping ratio is recommended as a better choice for general usage.

Figure 5:
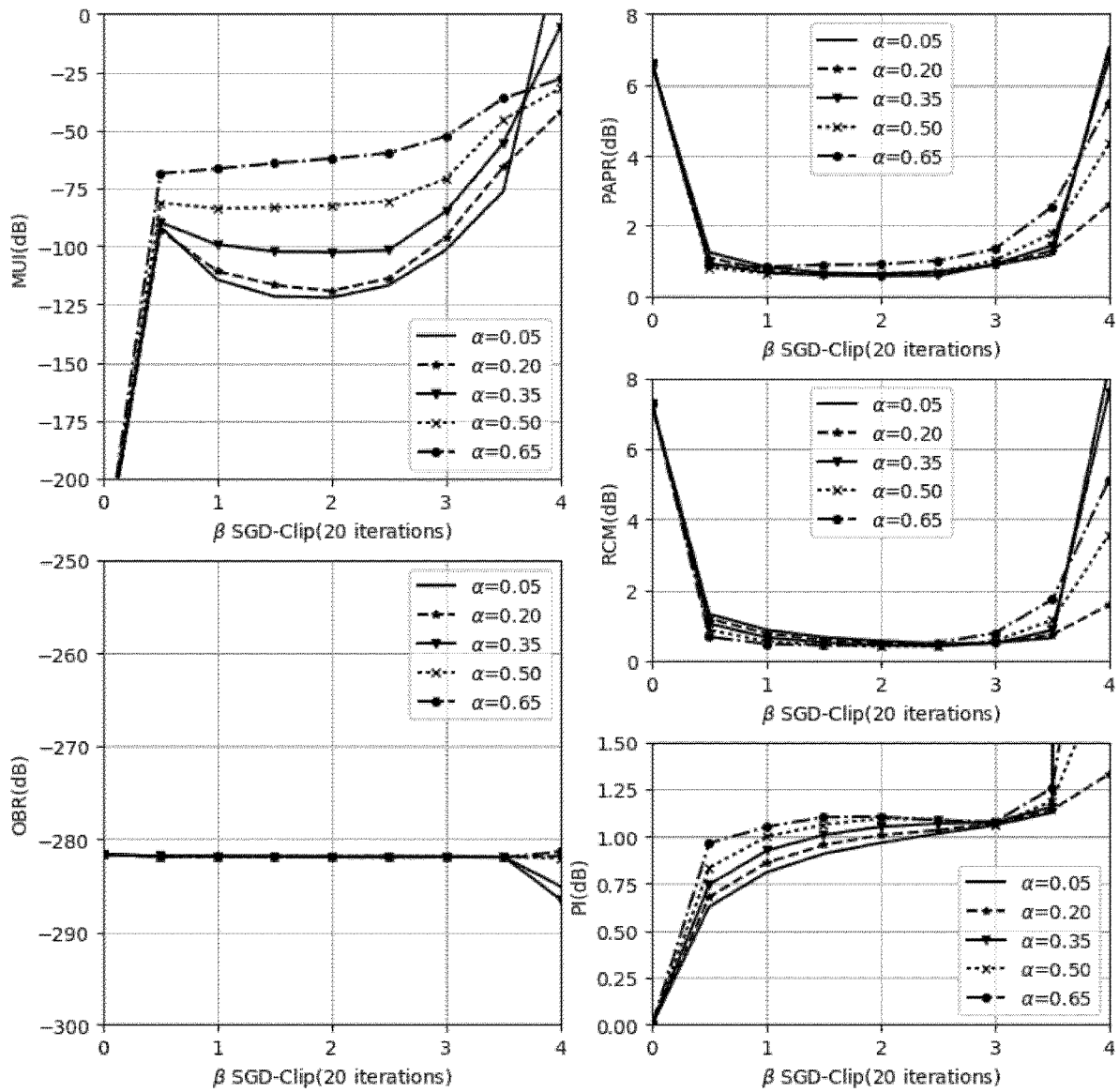
FIG. 5 shows an example for PAPR reduction of MIMO-OFDM according to some example embodiments of the present disclosure.

As shown in FIG. 5, with adaptive clipping ratio μ, accumulating rates also have large impacts on the performances. For 1≤β≤3, both PAPR and RCM have lower values, but MUI and PI have large fluctuations. To have relatively lower MUI and PI, α=0.2, β=2.0 is selected empirically.

In the following section, the performance of the GD based PAPR reduction scheme (labelled by SGD-Clip) with original zero-forcing precoding scheme (without PAPR reduction, labelled by ZF), zero-forcing precoding plus clipping scheme (labelled by ZF+Clip), EM-TGM-GAMP scheme will be tested.

For example, the Environment parameters may be set as:
Modulation order: 16-QAM constellation
Number of antennas: N=50
Number of streams: M=5
Number of all OFDM tones: W=64
Number of the OFDM tones used for guard bands: $|\mathcal{T}^c|=8$
Number of the OFDM tones used for data transmission: $|\mathcal{T}|=W-|\mathcal{T}^c|=56$.

Figure 6:
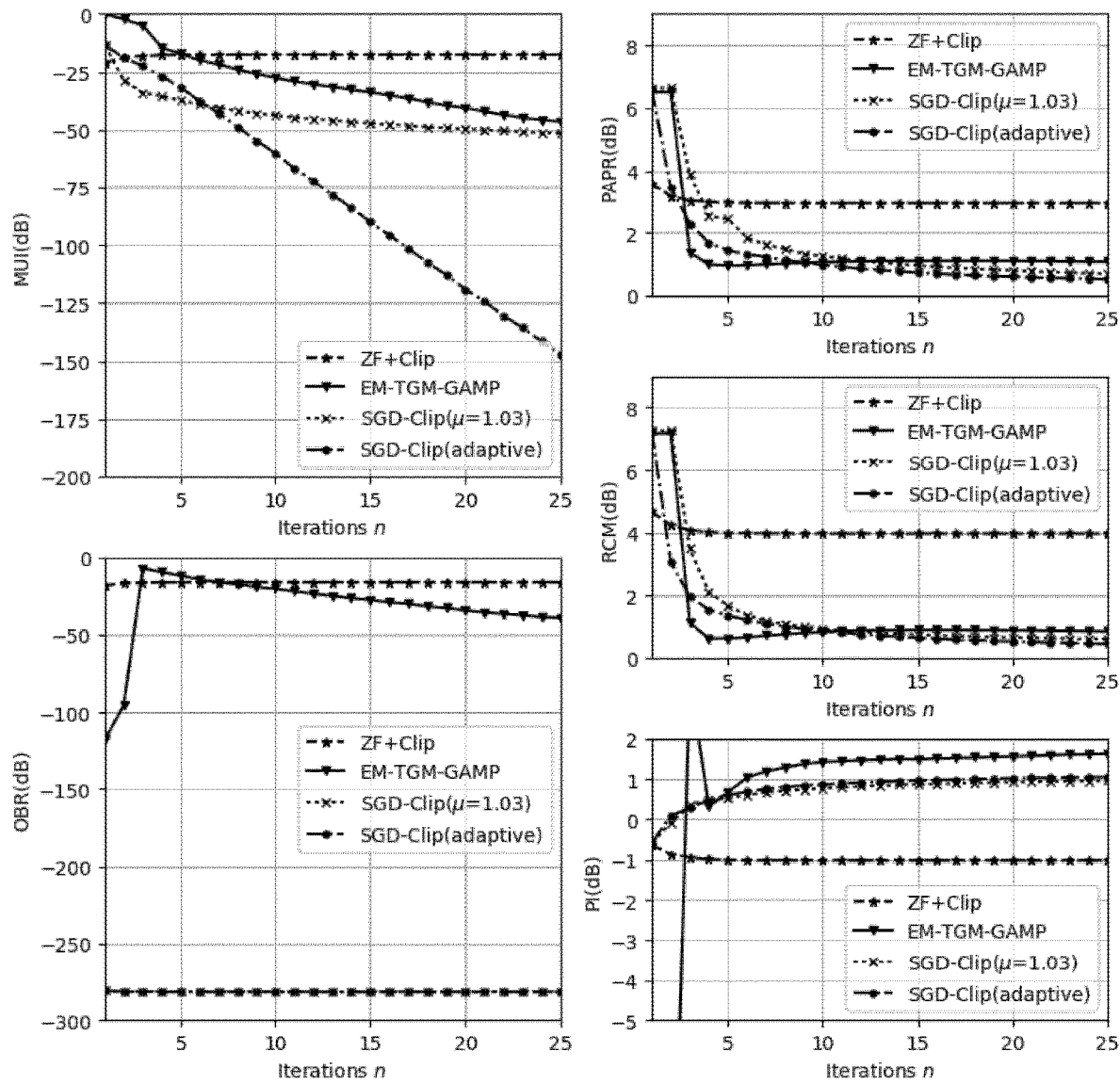
FIG. 6 shows an example for PAPR reduction of MIMO-OFDM according to some example embodiments of the present disclosure.

FIG. 6 shows the convergence rate in accordance with the different schemes. As shown in FIG. 6, the proposed SGD-Clip approaches converge very fast for PAPR/RCM measurements. Both SGD-Clip approaches can get the same PAPR/RCM reductions with EM-TGM-GAMP after about 12 iterations. The SGD-Clip approaches can get much lower PI, MUI and OBR than other methods with only 10 iterations. With adaptive clipping ratio, SGD-Clip approach can get much lower MUI.

Figure 7:
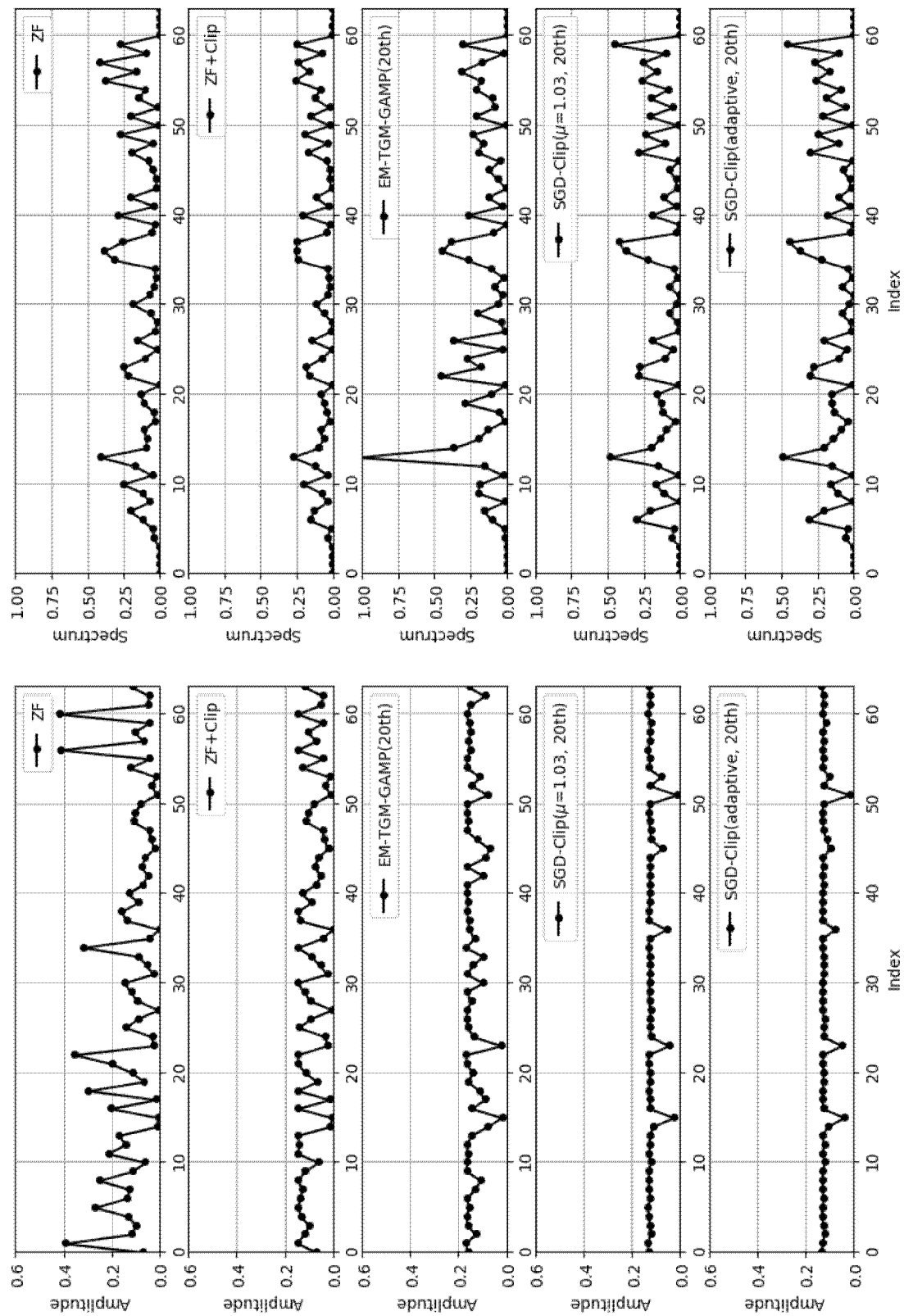
FIG. 7 shows an example for PAPR reduction of MIMO-OFDM according to some example embodiments of the present disclosure.

To understand the performance of the proposed algorithm intuitively, for signals on the first antenna, the amplitudes in both time and frequency domains are plotted and shown in FIG. 7. The signals on the time domain lie on the left, it is easy to decide whether the signal has high or low PAPR because large PAPR means large fluctuations in time domain.

The original data precoded by zero-forcing has large fluctuations, while classical clipping method clipped the high values to relatively low value and left other value unchanged. Differently, both EM-TGM-GAMP and SGD-Clip approaches try to reduce the PAPR by exploiting the degrees-of-freedom in massive MIMO scheme. Therefore, these methods can get much lower PAPRs. It is evident that SGD-Clip approaches (both fixed and adaptive μ) with 20 iterations get the best reduction, and EM-TGM-GAMP with 20 iterations gets second best reduction.

The amplitudes of signals in frequency domain are shown on the right part. Though the signals are quite different in time domain, they are quite similar in frequency domain. It should be noticed that the first and the last four points of the signals are tones for guard bands, which should always be zero in theory. For classical clipping method, some points arise a little. While for the proposed SGD-Clip approaches, these points are almost zero. This is an impressive advantage of SGD-Clip algorithm, very low out-band power leakage (OBR←280 dB).

Figure 8:
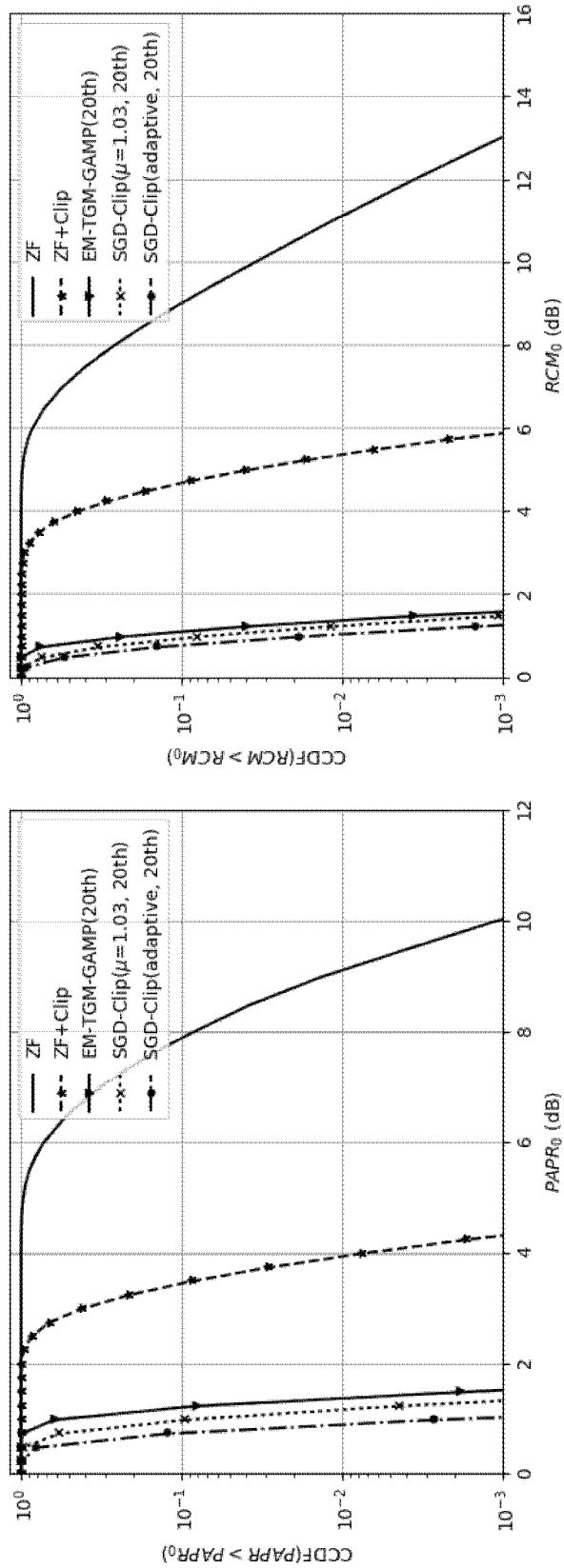
FIG. 8 shows an example for PAPR reduction of MIMO-OFDM according to some example embodiments of the present disclosure.

Complementary cumulative distribution function (CCDF) is used to evaluate the PAPR/RCM reduction performance. As shown in FIG. 8, the SGD-Clip approach with adaptive clipping ratio gets the best PAPR reduction and reduce the averaged PAPR to less than 1 dB at CCDF(PAPR)=1%, which is a very low PAPR level. In addition, SGD-Clip approach with fixed clipping ratio also gets a good PAPR reduction, a little better than EM-TGM-GAMP method.

For the RCM reduction, the CCDF curves of SGD-Clip approaches are very close to the curve of the EM-TGM-GAMP method. Both SGD-based approach with adaptive clipping ratio and EM-TGM-GAMP can reduce RCM to about 1 dB at CCDF(PAPR)=1%, which is a very low level.

The error-rate performance is measured by the average symbol-error rate (SER) across streams. For our test, the symbols are randomly generated in the 16-QAM constellation. A symbol is said to be in error when it is decoded as another symbol in the constellation.

Figure 9:
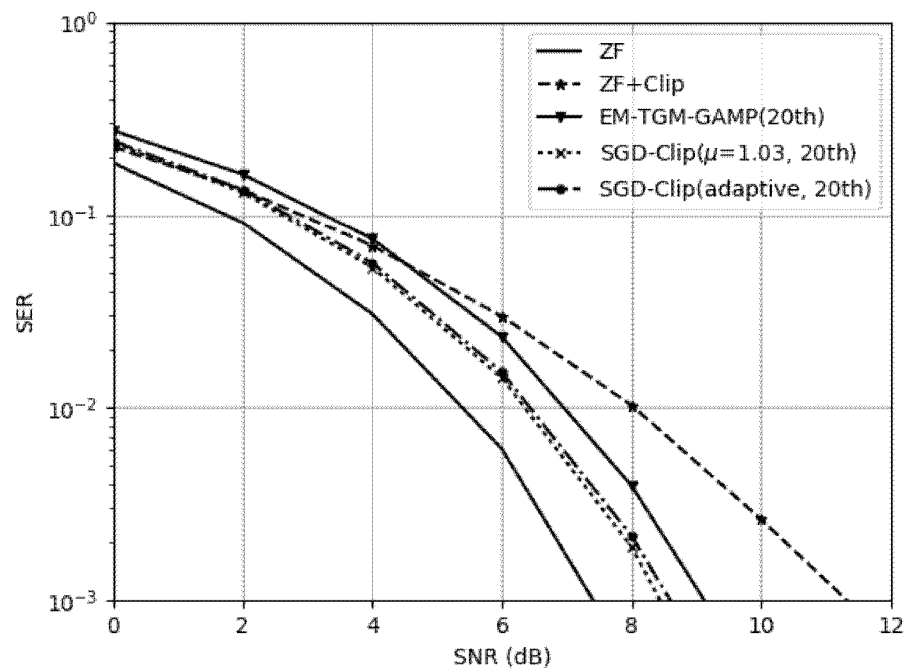
FIG. 9 shows an example for PAPR reduction of MIMO-OFDM according to some example embodiments of the present disclosure.

As shown in FIG. 9, the proposed SGD-Clip approaches get better SERs than EM-TGM-GAMP with 20 iterations. The reason why SGD-Clip and EM-TGM-GAMP approaches get worse SER than zero-forcing approach is that they increase the power of final signals but the power of the original signals is the same. As a result, final signals with larger power will have larger noise at the same SNR level. After decoding, larger noise will put larger impacts on the decoded signal, and the SER performance would be worse.

For zero-forcing plus clipping approach, the clipping operation would damage the original encoded signal, which should degrade the SER performance. But the power of final signal is also decreased, so the added noise is getting less at the same level of SNR, which would compensate the degradation of SER performance to some extent. However, when the SNR become large enough, the compensation would be negligible.

To testify the conclusion that SGD-Clip approach could fully retain the original information, another test needs to be conducted. In this test, the same noises are added to the final signals of different algorithms, and their SERs are calculated to see if the original information has been fully retained. It is known that the SER would become worse if some original information is lost.

Figure 10:
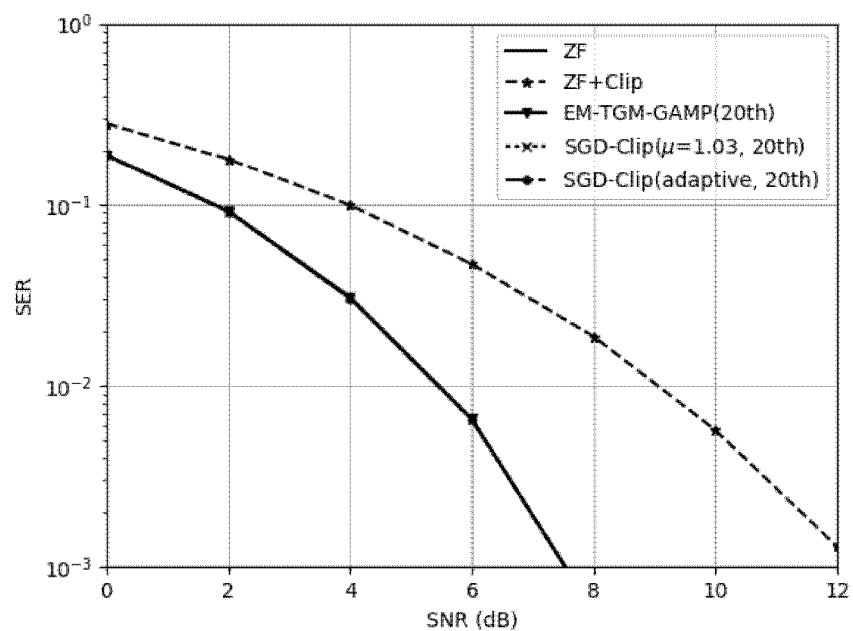
FIG. 10 shows an example for PAPR reduction of MIMO-OFDM according to some example embodiments of the present disclosure.

The result is shown in FIG. 10, since the noises of different algorithms are the same for a specific SNR level, the SNR here refers to the ratio of zero-forcing signal power to the noise power. For zero-forcing plus clipping approach, since the clipping damages the original information, its SER performance is the worst. While for other approaches, the SER curves are almost the same. There are no significant differences between zero-forcing, EM-TGM-GAMP and SGD-Clip approaches, which mean that EM-TGM-GAMP and SGD-Clip approaches fully retain the original information.

As for the cost of retaining the original information, EM-TGM-GAMP approach increases the power by about 1.5 dB, while SGD-Clip approaches only increase the power by about 1 dB, which can be observed in FIG. 6 (PI convergence). This is another advantage, relatively lower PI, of the GD based approach over the traditional optimization approaches.

Since the proposed SGD-Clip approach exploits the redundant degrees-of-freedom in massive MIMO, the total number of streams for all users should be less than the total number of transmitting antennas, i.e. M<N. Otherwise, there would be no redundant degrees-of-freedom which can be exploited.

Figure 11:
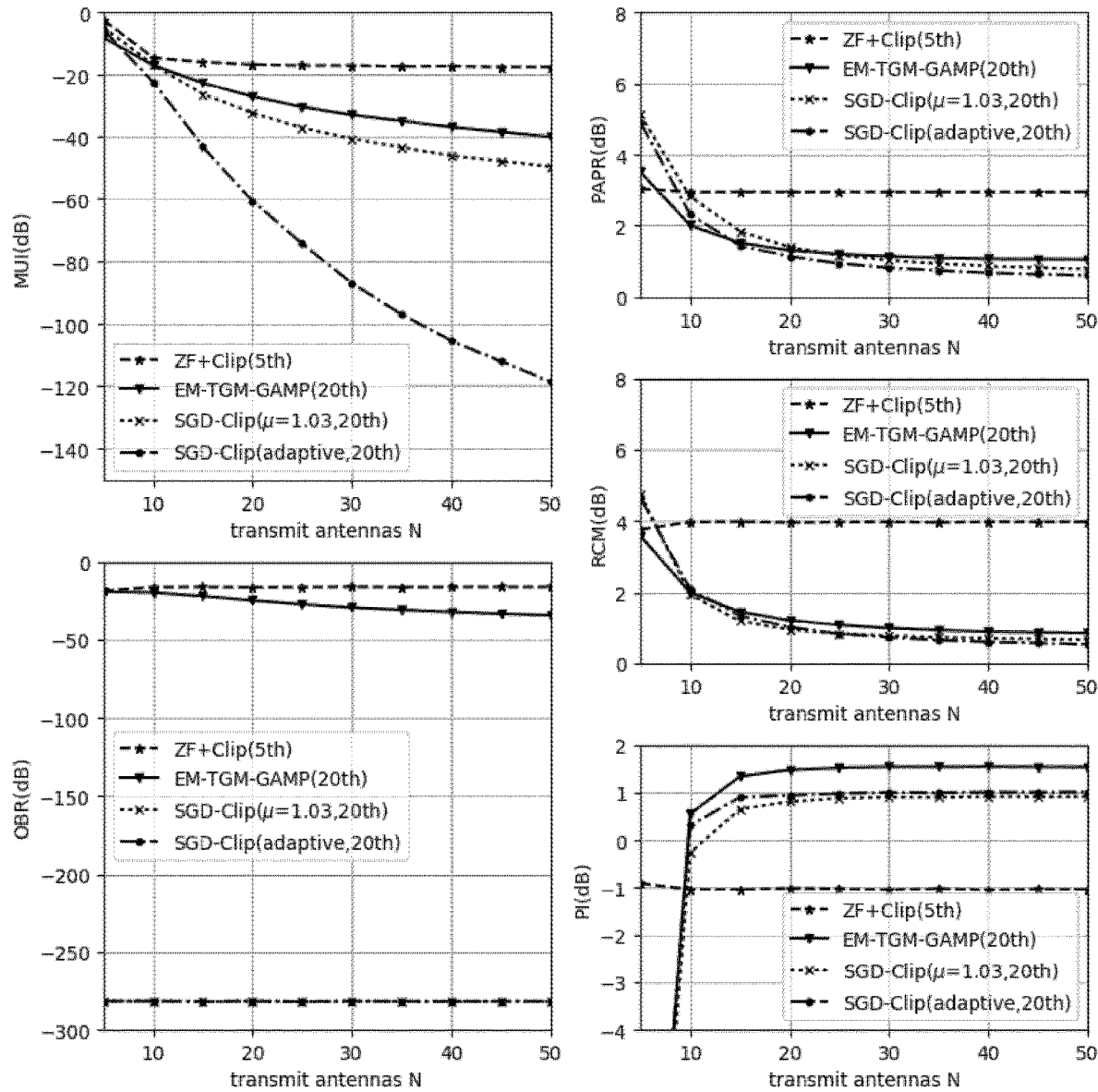
FIG. 11 shows an example for PAPR reduction of MIMO-OFDM according to some example embodiments of the present disclosure.

As shown in FIG. 11, with 5 streams (M=5), the SGD-Clip approach and EM-TGM-GAMP approach get good PAPR reductions with at least 20 transmit antennas. And increasing the number of transmit antennas yields improved PAPR performance. But for zero-forcing plus clipping approach, increasing the number of transmit antennas has few benefits.

More transmit antennas bring more degrees-of-freedom, and the solution space of $\bar{s}=\bar{E}a$ also becomes larger. Therefore, it is easier for SGD-Clip approach to find the local optimal solution. From the testing result, we can conclude that to have an excellent PAPR reduction, the number of antennas should be at least 4 times of the number of user streams, i.e. N≥4M.

By means of the above described test result for performance, the proposed GD based massive MIMO-OFDM PAPR reduction algorithm has several distinct advantages as following:

Impressive PAPR performance: signal PAPR can be reduced to a very low level.

Low OBR and MUI: the optimum solution has quite low OBR and MUI.

Rapid convergence: 10 to 20 iterations are enough to find an optimum solution.

No information loss: fully retain the signal information at the cost of only 1 dB power increase.

Easy to implement: just a simple two-layer neural network combined with an improved clipping method.

Profit from AI domain: can use ANN implemented in hardware (DSP, GPU, FPGA, NPU) easily, this can remove most computing consuming of CPU.

In some example embodiments, an apparatus capable of performing the method 200 (for example, the gNB 110) may comprise means for performing the respective steps of the method 200. The means may be implemented in any suitable form. For example, the means may be implemented in a circuitry or software module.

In some example embodiments, the apparatus comprises: means for generating sequences of OFDM symbols on subcarriers on a downlink channel from the network device to a terminal device; means for determining a processing matrix of the downlink channel at least partially based on characteristics of the downlink channel; means for obtaining reference values of parameters of a signal generation model; and means for iteratively performing the following for a number of times: adjusting, based on the sequences of OFDM symbols and the processing matrix, the reference values of the parameters of the signal generation model, the parameters being signals for transmitting via transmitting ports of the network device on the downlink channel to the terminal device; and updating the reference values of the parameters of the signal generation model by clipping the adjusted values of the parameters of the signal generation model.

In some example embodiments, means for generating the sequences of the OFDM symbols comprises: means for obtaining the number of the subcarriers on the downlink channel, the number of OFDM symbols in each of the sequences, and the number of the antennas of the network device; and means for generating the sequences of the OFDM symbols based on the number of the subcarriers, the number of OFDM symbols in each of the sequences and the number of the antennas of the network device.

In some example embodiments, means for determining the processing matrix comprises: means for determining a channel matrix characterizing the downlink channel based on the number of the subcarriers on the downlink channel, the number of OFDM symbols in each of the sequences and the number of the antennas of the network device and means for determining the processing matrix by performing transposing and Inverse Discrete Fourier Transform IDFT on the channel matrix.

In some example embodiments, wherein the signal generation model is an Artificial Neural Network ANN, the signal generation model comprises an input layer and an output layer, the processing matrix of the downlink channel is provided to the input layer as an input, the sequences of the OFDM symbols are provided by the output layer, the input layer and the output layer are associated with each other by the parameters.

In some example embodiments, means for obtaining the reference values comprises means for obtaining preset values as the reference values.

In some example embodiments, means for adjusting the reference values comprises: means for obtaining the updated values as the reference values; and means for adjusting the parameters based on the sequences of OFDM symbols and the processing matrix, the updated values of the parameters of the signal generation model.

In some example embodiments, the reference values are adjusted using an optimization process comprising determining differences between the sequences of the OFDM symbols and a product of the parameters of the signal generation model and the processing matrix of the downlink channel; and adjusting the reference values of the parameters of the signal generation model based on the differences.

In some example embodiments, the optimization process is selected from a group consisting of: Stochastic Gradient Descent; Batch Gradient Descent; and Mini-batch Gradient Descent.

In some example embodiments, means for updating the reference values of the parameters comprises: means for determining average powers of the signals at least partially based on the adjusted values of the parameters; means for determining an upper limit of the amplitudes of the signals based on the clipping ratio for limiting amplitudes of the signals and the average powers; and means for clipping the adjusted values of the parameters based on the upper limit of the amplitudes of the signals.

Figure 12:
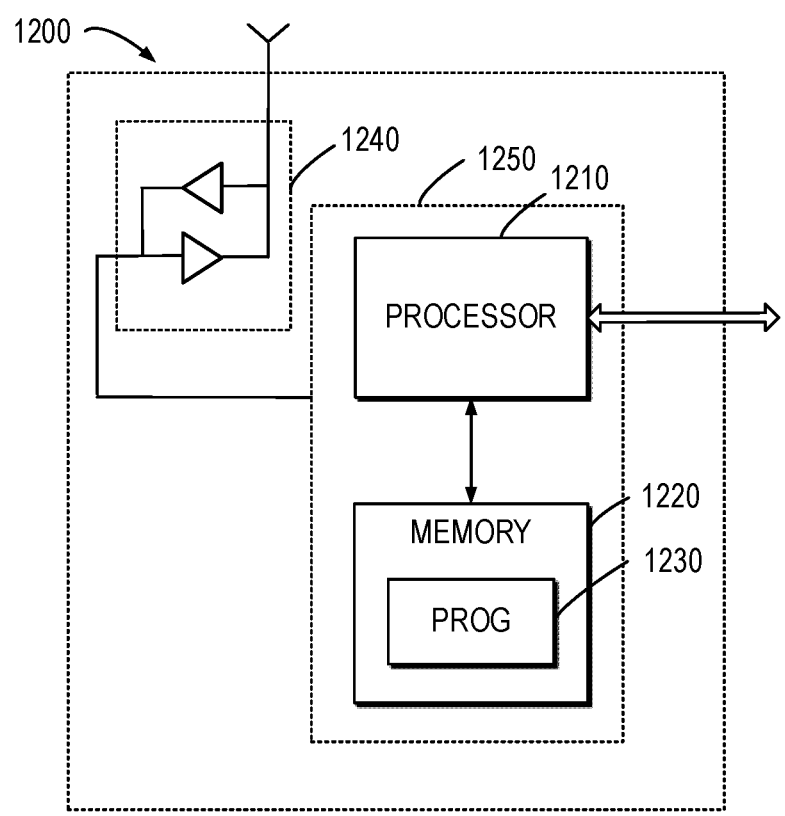
FIG. 12 is a simplified block diagram of a device that is suitable for implementing example embodiments of the present disclosure.

FIG. 12 is a simplified block diagram of a device 1200 that is suitable for implementing example embodiments of the present disclosure. The device 1200 can be considered as a further example implementation of gNB 110 as shown in FIG. 1.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1220 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the example embodiments of the present disclosure, as discussed herein with reference to FIGS. 2 to 3. The example embodiments herein may be implemented by computer software executable by the processor 1210 of the device 1200, or by hardware, or by a combination of software and hardware. The processor 1210 may be configured to implement various example embodiments of the present disclosure. Furthermore, a combination of the processor 1210 and memory 1220 may form processing means 1250 adapted to implement various example embodiments of the present disclosure.

The memory 1220 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a network device, said method comprising:
    generating sequences of Orthogonal Frequency Division Multiplexing (OFDM) symbols on subcarriers on a downlink channel from the network device to a terminal device;
    determining a processing matrix of the downlink channel at least partially based on characteristics of the downlink channel;
    obtaining reference values of parameters of a signal generation model;
    iteratively performing the following for a number of times:
        adjusting, based on the sequences of Orthogonal Frequency Division Multiplexing (OFDM) symbols and the processing matrix, the reference values of the parameters of the signal generation model, the parameters being signals for transmitting via transmitting ports of the network device on the downlink channel to the terminal device; and updating the reference values of the parameters of the signal generation model by clipping the adjusted reference values of the parameters of the signal generation model;

obtaining the updated values as the reference values; and adjusting the reference values of the parameters of the signal generation model based on the sequences of Orthogonal Frequency Division Multiplexing (OFDM) symbols and the processing matrix, and based on the updated reference values of the parameters of the signal generation model.

2. The method of claim 1, wherein generating the sequences of the Orthogonal Frequency Division Multiplexing (OFDM) symbols comprises:

obtaining the number of the subcarriers on the downlink channel, the number of Orthogonal Frequency Division Multiplexing (OFDM) symbols in each of the sequences, and the number of the antennas of the network device; and generating the sequences of the Orthogonal Frequency Division Multiplexing (OFDM) symbols based on the number of the subcarriers, the number of Orthogonal Frequency Division Multiplexing (OFDM) symbols in each of the sequences and the number of the antennas of the network device.

3. The method of claim 1, wherein determining the processing matrix comprises:

determining a channel matrix characterizing the downlink channel based on the number of the subcarriers on the downlink channel, the number of Orthogonal Frequency Division Multiplexing (OFDM) symbols in each of the sequences and the number of the antennas of the network device; and determining the processing matrix by performing transposing and Inverse Discrete Fourier Transform (IDFT) on the channel matrix.

4. The method of claim 1, wherein the signal generation model is an Artificial Neural Network ANN, the signal generation model comprises an input layer and an output layer, the processing matrix of the downlink channel is provided to the input layer as an input, the sequences of the Orthogonal Frequency Division Multiplexing (OFDM) symbols are provided by the output layer, the input layer and the output layer are associated with each other by the parameters.

5. The method of claim 1, wherein obtaining the reference values comprises:

obtaining preset values as the reference values.

6. The method of claim 1, wherein the reference values are adjusted using an optimization process comprising:

determining differences between the sequences of the Orthogonal Frequency Division Multiplexing (OFDM) symbols and a product of the parameters of the signal generation model and the processing matrix of the downlink channel; and adjusting the reference values of the parameters of the signal generation model based on the differences.

7. The method of claim 6, wherein the optimization process is selected from a group consisting of:

Stochastic Gradient Descent;
Batch Gradient Descent; and
Mini-batch Gradient Descent.

8. The method of claim 1, wherein updating the reference values of the parameters comprises:

determining average powers of the signals at least partially based on the adjusted values of the parameters;

determining an upper limit of the amplitudes of the signals based on the clipping ratio for limiting amplitudes of the signals and the average powers; and clipping the adjusted values of the parameters based on the upper limit of the amplitudes of the signals.

9. A network device, comprising:

at least one processor; and at least one memory including computer program code;

the at least one memory and the computer program code are configured to, with the at least one processor, cause the terminal device at least to:

generate sequences of Orthogonal Frequency Division Multiplexing (OFDM) symbols on subcarriers on a downlink channel from the network device to a terminal device;

determine a processing matrix of the downlink channel at least partially based on characteristics of the downlink channel;

obtain reference values of parameters of a signal generation model;

iteratively perform the following for a number of times:

adjust, based on the sequences of Orthogonal Frequency Division Multiplexing (OFDM) symbols and the processing matrix, the reference values of the parameters of the signal generation model, the parameters being signals for transmitting via transmitting ports of the network device on the downlink channel to the terminal device; and update the reference values of the parameters of the signal generation model by clipping the adjusted reference values of the parameters of the signal generation model;

obtaining the updated values as the reference values; and adjusting the reference values of the parameters of the signal generation model based on the sequences of Orthogonal Frequency Division Multiplexing (OFDM) symbols and the processing matrix, and based on the updated reference values of the parameters of the signal generation model.

10. The network device of claim 9, wherein the network device is caused to generate the sequences of the Orthogonal Frequency Division Multiplexing (OFDM) symbols by:

obtaining the number of the subcarriers on the downlink channel, the number of Orthogonal Frequency Division Multiplexing (OFDM) symbols in each of the sequences, and the number of the antennas of the network device; and generating the sequences of the Orthogonal Frequency Division Multiplexing (OFDM) symbols based on the number of the subcarriers, the number of Orthogonal Frequency Division Multiplexing (OFDM) symbols in each of the sequences and the number of the antennas.

11. The network device of claim 9, wherein the network device is caused to determine the processing matrix by:

determining a channel matrix characterizing the downlink channel based on the number of the subcarriers on the downlink channel, the number of Orthogonal Frequency Division Multiplexing (OFDM) symbols in each of the sequences and the number of the antennas of the network device; and determining the processing matrix by performing transposing and Inverse Discrete Fourier Transform (IDFT) on the channel matrix.

12. The network device of claim 9, wherein the signal generation model is an Artificial Neural Network ANN, the signal generation model comprises an input layer and an output layer, the processing matrix of the downlink channel is provided to the input layer as an input, the sequences of the Orthogonal Frequency Division Multiplexing (OFDM) symbols are provided by the output layer, and the input layer and the output layer are associated with each other by the parameters.

13. The network device of claim 9, wherein the network device is caused to obtain the reference values by:
obtaining preset values as the reference values.

14. The network device of claim 9, wherein the reference values are adjusted using an optimization process comprising:
determining differences between the sequences of the Orthogonal Frequency Division Multiplexing (OFDM) symbols and a product of the parameters of the signal generation model and the processing matrix of the downlink channel; and
adjusting the reference values of the parameters of the signal generation model based on the differences.

15. The network device of claim 14, wherein the optimization process is selected from a group consisting of:
Stochastic Gradient Descent;
Batch Gradient Descent; and
Mini-batch Gradient Descent.

16. The network device of claim 9, wherein the network device is caused to update the reference values of the parameters by:
determining average powers of the signals at least partially based on the adjusted values of the parameters;
determining an upper limit of the amplitudes of the signals based on the clipping ratio for limiting amplitudes of the signals and the average powers; and
clipping the adjusted values of the parameters based on the upper limit of the amplitudes of the signals.

17. A computer program, embodied on a non-transitory computer readable medium, said computer program comprising computer executable code which, when executed by a processor, causes the processor to:
generate sequences of Orthogonal Frequency Division Multiplexing (OFDM) symbols on subcarriers on a downlink channel from the network device to a terminal device;
determine a processing matrix of the downlink channel at least partially based on characteristics of the downlink channel;
obtain reference values of parameters of a signal generation model;
iteratively perform the following for a number of times:
adjust, based on the sequences of Orthogonal Frequency Division Multiplexing (OFDM) symbols and the processing matrix, the reference values of the parameters of the signal generation model, the parameters being signals for transmitting via transmitting ports of the network device on the downlink channel to the terminal device; and
update the reference values of the parameters of the signal generation model by clipping the adjusted reference values of the parameters of the signal generation model;
obtain the updated values as the reference values; and
adjust the reference values of the parameters of the signal generation model based on the sequences of Orthogonal Frequency Division Multiplexing (OFDM) symbols and the processing matrix, and based on the updated reference values of the parameters of the signal generation model.

* * * * *